US012717367B2

(12) United States Patent
Chew et al.

(10) Patent No.: US 12,717,367 B2
(45) Date of Patent: Aug. 25, 2026

(54) CIRCUITRY FOR LOW-DROPOUT REGULATOR WITH OVERVOLTAGE PROTECTION CIRCUIT

(71) Applicant: SKYECHIP BERHAD, Bayan Lepas (MY)

(72) Inventors: Jaw Wen Chew, Bayan Lepas (MY); Chun Wei Lee, Bayan Lepas (MY)

(73) Assignee: SKYECHIP BERHAD, Bayan Lepas (MY)

( * ) Notice: Subject to any disclaimer, the term of this patent is extended or adjusted under 35 U.S.C. 154(b) by 98 days.

(21) Appl. No.: 18/888,779

(22) Filed: Sep. 18, 2024

(65) Prior Publication Data

US 2025/0306616 A1 Oct. 2, 2025

(30) Foreign Application Priority Data

Apr. 2, 2024 (MY) ................................ 2024001998

(51) Int. Cl.
*G05F 1/571* (2006.01)
*G05F 1/575* (2006.01)

(52) U.S. Cl.
CPC .............. *G05F 1/571* (2013.01); *G05F 1/575* (2013.01)

(58) Field of Classification Search
CPC .......... G05F 1/462; G05F 1/465; G05F 1/468; G05F 1/56; G05F 1/575; G05F 1/562; G05F 1/565; G05F 1/567; G05F 1/569; G05F 1/571; G05F 1/573; G05F 1/5735; G05F 3/10; G05F 3/16; G05F 3/18; G05F 3/185; G05F 3/20; G05F 3/26; G05F 3/30; G05F 3/205; G05F 3/22; G05F 3/24; G05F 3/222; G05F 3/242; G05F 3/225; G05F 3/227; G05F 3/245; G05F 3/247; G05F 3/262; G05F 3/265; G05F 3/267; G05F 1/463;
(Continued)

(56) References Cited

U.S. PATENT DOCUMENTS 7,132,880 B2 * 11/2006 Ingino, Jr. ............ H03K 17/223 327/541
9,734,904 B1 * 8/2017 Cho .......................... G05F 3/24
(Continued)

FOREIGN PATENT DOCUMENTS

CN 109213255 A 1/2019
EP 2503690 A3 * 3/2012 ........... H03K 17/082

*Primary Examiner* — Crystal L Hammond
*Assistant Examiner* — Nusrat Quddus
(74) *Attorney, Agent, or Firm* — Jayne Saydah

(57) ABSTRACT

A process for regulating power supply using a low-dropout regulator may include detecting voltage levels based on a predetermined first voltage level as high voltage and a second voltage level as medium voltage, wherein the high voltage is powered up followed by the medium voltage; a shifting bias mechanism when high voltage is detected during the initial power up of the high voltage rail, including turning on the overvoltage protection circuit, lowering actual bias voltage to counter back the required high bias voltage, and applying the actual bias voltage for a feedback system; performing the fix bias mechanism when medium voltage is detected, including turning off the overvoltage protection circuit and applying a fixed voltage reference to an actual pass gate of source follower for the feedback system enabling an instant startup together with the medium voltage when it powers up.

9 Claims, 4 Drawing Sheets

(58) Field of Classification Search

CPC ............ G05F 1/46; G05F 1/461; H02M 1/32; H02M 2001/322; H02M 2001/327; H02M 1/34; H02M 2001/342; H02M 2001/344; H02M 2001/346; H02M 2001/348; H02M 1/36; H02M 1/38; H02M 1/42; H02M 1/4208; H02M 1/4216; H02M 1/4225; H02M 1/4233; H02M 1/4241; H02M 1/425; H02M 1/4258; H02M 1/4266; H02M 2001/4275; H02M 2001/4283; H02M 2001/4291; G01R 19/165; G01R 19/16504; G01R 19/16509; G01R 19/16514; G01R 19/16519; G01R 19/16523; G01R 19/16528; G01R 19/16533; G01R 19/16538; G01R 19/16542; G01R 19/16547; G01R 19/16552; G01R 19/16557; G01R 19/16561; G01R 19/16566; G01R 19/16571; G01R 19/16576; G01R 19/1658; G01R 19/16585; G01R 19/1659; G01R 19/16595; G01R 19/17; H02H 7/122; H02H 7/1222; H02H 7/1225; H02H 7/1227; H02H 7/125; H02H 7/1252; H02H 7/1255; H02H 7/1257

See application file for complete search history.

(56) References Cited

U.S. PATENT DOCUMENTS

| | | | | |
|---|---|---|---|---|
| 10,152,072 | B1 * | 12/2018 | Elhebeary | G05F 1/468 |
| 11,936,371 | B1 * | 3/2024 | Vangara | H03K 17/0822 |
| 2009/0256540 | A1 * | 10/2009 | Yang | G05F 1/575<br>323/282 |
| 2010/0213909 | A1 * | 8/2010 | Nakashimo | G05F 1/5735<br>323/282 |
| 2014/0077777 | A1 * | 3/2014 | Vemula | G05F 1/56<br>323/280 |
| 2014/0300332 | A1 * | 10/2014 | Ganta | G05F 1/56<br>323/273 |
| 2015/0309518 | A1 * | 10/2015 | Nagda | G05F 1/468<br>323/274 |
| 2016/0154415 | A1 | 6/2016 | Bîzîitu et al. | |
| 2019/0079551 | A1 | 3/2019 | Tourret | |
| 2019/0165747 | A1 * | 5/2019 | Couglar | H02M 3/1584 |
| 2024/0210449 | A1 * | 6/2024 | Ganesan | G01R 19/16528 |
| 2024/0231404 | A1 * | 7/2024 | Liu | G05F 1/575 |
| 2025/0130606 | A1 * | 4/2025 | Chong | G05F 1/575 |
| 2025/0208638 | A1 * | 6/2025 | Galan | H03K 17/08 |
| 2026/0088809 | A1 * | 3/2026 | Kuriachan | H03K 5/02 |

* cited by examiner

CIRCUITRY FOR LOW-DROPOUT REGULATOR WITH OVERVOLTAGE PROTECTION CIRCUIT

CROSS-REFERENCE TO RELATED APPLICATIONS

This application claims priority to and the benefit of Malaysian Patent Application No. PI2024001998 filed in the Malaysian Intellectual Property Office on Apr. 2, 2024, the entire contents of which are incorporated herein by reference its entirety.

TECHNICAL FIELD

The present relates to a process for regulating power supply using a low-dropout regulator, utilizing an overvoltage protection circuit for preventing damage to downstream blocks.

BACKGROUND ART

The internal circuits require a noise-free and stable voltage supplied by a low-dropout regulator (LDO) to get an optimal performance. However, high performance LDOs typically demand a higher input voltage, leading to significant power dissipation due to increased dropout voltage. A dual-supply LDO architecture addresses this issue by employing a lower voltage rail for the high-current path, minimizing dropout, and enhancing efficiency. However, this configuration introduces a vulnerability to Cautious Operation Area (COA) failure during power up transition, requiring design consideration and sequencing to mitigate the risk.

There have been several solutions provided for circuity protection during power up and down sequence for semiconductor industry in which few of them are discussed below:

US2016154415A1 discloses a method for operating a low-dropout regulator (LDO) system in either a voltage regulation or power balancing mode. The method compares reference voltage to feedback voltages to determine current demands on the LDO system, utilizing a reference resistor and a shunt resistor for measurement. In response to these demands, the method adjusts the current flowing through a transistor to maintain a constant output voltage on the load. However, this approach lacks an immediate standby voltage for the supply rail, potentially introducing a delay in circuit response.

CN109213255A discloses a start-up overshoot suppression circuit for the low-dropout regulator (LDO). This circuit employs a load current detection unit, a current-to-voltage converter, and a voltage comparator. The detection unit monitors the current flowing from the LDO to the load, feeding it to the converter, which transforms it into a voltage. This voltage is then compared by the comparator to the error amplifier output in the LDO. Based on this comparison, the comparator adjusts the error amplifier output, effectively limiting the current supplied by the LDO to the load and suppressing start-up overshoot voltage. While this method offers a simple design, small footprint, and low power consumption, it may introduce additional complexity to the LDO and potentially impact its transient response.

Furthermore, US20190079551A1 proposes a low-dropout regulator (LDO) with a high-gain amplifier for voltage regulation. This amplifier receives a current biasing signal and generates a regulated output voltage. A regulation adjustment circuit, including a comparator, monitors the output voltage against a threshold. If the voltage drops below the threshold, the comparator boosts the current bias, increasing output voltage. conversely, if the voltage exceeds the threshold, the comparator activates a dynamic pulldown circuit to reduce the output. While this method offers dynamic voltage regulation, it requires significant chip area due to the multiple circuits and gating points, potentially impacting stability and increasing complexity.

Nevertheless, the references described above, and other existing techniques still suffer from several problems of which the objectives and features of the present invention attempt to address. Therefore, it can be seen that there is a need to provide a solution, especially to overcome the stated problem that enables a more efficient working system.

SUMMARY OF THE INVENTION

The following presents a simplified summary of the invention in order to provide a basic understanding of some aspects of the invention. This summary is not an extensive overview of the invention. Its sole purpose is to present some concepts of the invention in a simplified form as a prelude to the more detailed description that is presented later.

It is an objective of the present invention to provide a circuitry for regulating power supply using a low-dropout regulator that instantly start up a source follower when the supply reaches a power-ready voltage level.

A further objective of the present invention is to utilize overvoltage protection circuitry to handle any overvoltage situation and prevent damage to downstream blocks.

It is also objective of the present invention to seamlessly enables voltage to rise instantly as the voltage rises, reducing start up delay and overvoltage risks.

Further, it is an objective to protect against Cautious Operation Area (COA) violations for logic gate with different process corners during power sequences.

Accordingly, these objectives may be achieved by following the teachings of the present invention. The present invention relates to a process for regulating power supply using a low-drop out regulator, the method comprising the steps of: monitoring voltage levels by a power detector; detecting voltage level based on a predetermined first voltage level as high voltage and a second voltage level as medium voltage, wherein the high voltage and medium voltage power up at different times, with the high voltage powering up first followed by the medium voltage; turning on or turning off an overvoltage protection circuit unit based on the detected voltage levels; and regulating output voltage based on feedback loop utilizing the actual output voltage of the source follower and a predetermined safe voltage as a reference; characterised by performing shifting bias mechanism when the voltage protection circuit is turned on; and performing fix bias mechanism when the voltage protection circuit is turned off; wherein turning on the voltage protection circuit when high voltage is detected and turning off the voltage protection circuit when medium voltage is detected; wherein the shifting bias mechanism comprises of lowering actual bias voltage to counter back the required high bias voltage during the initial power up of the high voltage rail, and applying the actual bias voltage for a feedback system; wherein the fix bias mechanism comprises of applying a fixed voltage reference to an actual pass gate of source follower for the feedback system, enabling an instant startup together with the medium voltage when it powers up.

The present invention also relates to a circuitry system for regulating power supply using a low-drop out regulator, comprising: a bandgap circuit providing voltage reference; an operational amplifier; a source follower comprises a pass gate for internal power supply; characterized by an overvoltage protection circuit connected to a power detector comprising a logic gate device; wherein the logic gate device is configured to determine turning on or turning off the overvoltage protection circuit based on the signal received from the power detector and performing shifting bias mechanism or fix bias mechanism based on the detected voltage levels.

The foregoing and other objects, features, aspects, and advantages of the present invention will become better understood from a careful reading of a detailed description provided herein below with appropriate reference to the accompanying drawings.

BRIEF DESCRIPTION OF THE ACCOMPANYING DRAWING

So that the manner in which the above recited features of the present invention can be understood in detail, a more particular description of the invention, briefly summarized above, may have been referred by embodiments, some of which are illustrated in the appended drawings. It is to be noted, however, that the appended drawings illustrate only typical embodiments of this invention and are therefore not to be considered limiting of its scope, for the invention may admit to other equally effective embodiments.

These and other features, benefits, and advantages of the present invention will become apparent by reference to the following text figure, with like reference numbers referring to like structures across the views, wherein.

DETAILED DESCRIPTION OF THE PREFERRED EMBODIMENTS

Figure 1:
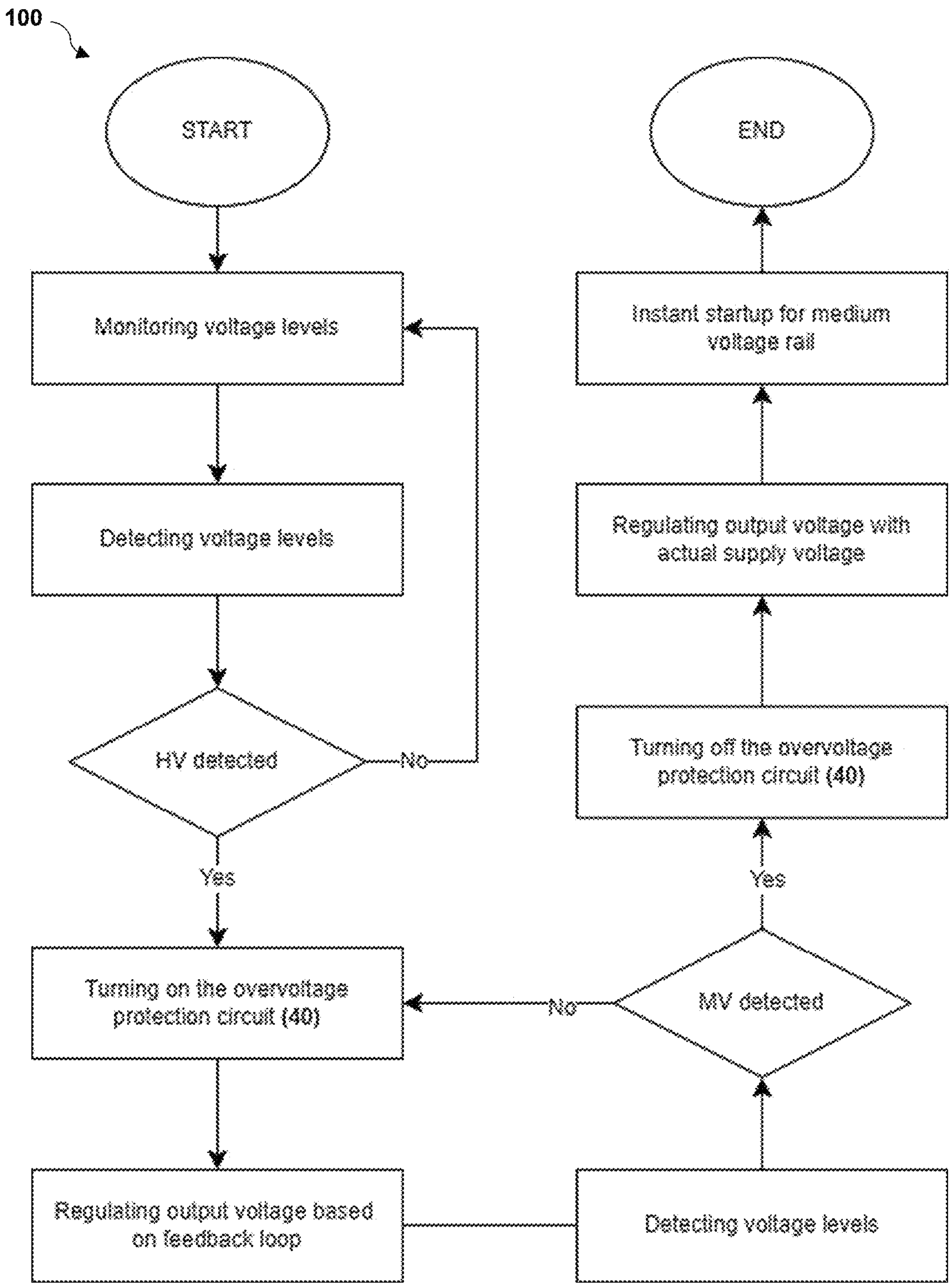
FIG. 1 is a process flowchart illustrating a process for regulating power supply using a low-dropout regulator in accordance with an embodiment of the present invention.

While the present invention is described herein by way of example using embodiments and illustrative drawings, those skilled in the art will recognize that the invention is not limited to the embodiments of drawing or drawings described and are not intended to represent the scale of the various components. Further, some components that may form a part of the invention may not be illustrated in certain figures, for ease of illustration, and such omissions do not limit the embodiments outlined in any way. It should be understood that the drawing and detailed description thereto are not intended to limit the invention to the particular form disclosed, but on the contrary, the invention is to cover all modifications, equivalents, and alternatives falling within the scope of the present invention as defined by the appended claims. As used throughout this description, the word "may" is used in a permissive sense (i.e. meaning having the potential to), rather than the mandatory sense, (i.e. meaning must). Further, the words "a" or "an" mean "at least one" and the word "plurality" means "one or more" unless otherwise mentioned. Furthermore, the terminology and phraseology used herein is solely used for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited, and is not intended to exclude other additives, components, integers, or steps. Likewise, the term "comprising" is considered synonymous with the terms "including" or "containing" for applicable legal purposes. Any discussion of documents, acts, materials, devices, articles, and the like are included in the specification solely for the purpose of providing a context for the present invention. It is not suggested or represented that any or all of these matters form part of the prior art base or were common general knowledge in the field relevant to the present invention.

In this disclosure, whenever a composition or an element or a group of elements is preceded with the transitional phrase "comprising", it is understood that we also contemplate the same composition, element, or group of elements with transitional phrases "consisting of", "consisting", "selected from the group of consisting of, "including", or "is" preceding the recitation of the composition, element, or group of elements and vice versa.

The present invention is described hereinafter by various embodiments with reference to the accompanying drawing, wherein reference numerals used in the accompanying drawing correspond to the like elements throughout the description. This invention may, however, be embodied in many different forms and should not be construed as limited to the embodiment set forth herein. Rather, the embodiment is provided so that this disclosure will be thorough and complete and will fully convey the scope of the invention to those skilled in the art. In the following detailed description, numeric values and ranges are provided for various aspects of the implementations described. These values and ranges are to be treated as examples only and are not intended to limit the scope of the claims. In addition, a number of materials are identified as suitable for various facets of the implementations. These materials are to be treated as exemplary and are not intended to limit the scope of the invention.

Referring to the drawing as shown in FIGS. 1 to 5, the present invention will now be described in more detail.

The present invention relates to a process (100) for regulating power supply using a low-drop out regulator, the method comprising the steps of: monitoring voltage levels (110) by a power detector (50); detecting voltage level (120) based on a predetermined first voltage level as high voltage and a second voltage level as medium voltage, wherein the high voltage and medium voltage power up at different times, with the high voltage powering up first followed by the medium voltage; turning on (141) or turning off (131) an overvoltage protection circuit (40) based on the detected voltage levels (120); and regulating output voltage based on feedback loop utilizing the actual output voltage of the source follower (30) and a predetermined safe voltage as a reference; characterised by performing shifting bias mechanism (140) when the overvoltage protection unit (40) is turned on; and performing fix bias mechanism (130) when the overvoltage protection unit (40) is turned off; wherein turning on the overvoltage protection circuit (40) when high voltage is detected and turning off the overvoltage protection circuit (40) when medium voltage is detected; wherein the shifting bias mechanism (140) comprises of lowering actual bias voltage (142) to counter back the required high bias voltage during the initial power up of the high voltage rail, and applying the actual bias voltage (143) for a feedback system; wherein the fix bias mechanism (130) comprises of applying a fixed voltage reference (132) to an actual pass gate of source follower (30) for the feedback system, enabling an instant startup together with the medium voltage when it powers up.

In accordance with an embodiment of the present invention, the voltage levels (110) are monitored from a bandgap circuit (10).

In accordance with an embodiment of the present invention, the first voltage level range is between 1.32V to 1.96V, preferably at 1.8V and the second voltage level range is between 0.96V to 1.32V, preferably at 1.1V. The voltage is detected by the power detector (50), wherein the first voltage level is predetermined as high voltage and the second voltage level as medium voltage.

In accordance with an embodiment of the present invention, a safe voltage is predetermined for supply that is lower than 1.05V but the value depends on the specific process node used to manufacture the logic gate device (41). Since smaller process nodes allow for lower safe operating voltage, the predetermined voltage can be as low as 0.96V for suitable process. During the high voltage, the overvoltage protection circuit (40) is turned on (141) while providing a Cautious Operation Area safe voltage to all source followers (30). Without this voltage, the logic gate device (41) will not be able to withstand the medium voltage supply as it is greater than the predetermined safe voltage.

The present invention also relates to a circuitry system (200, 200*a*) for regulating power supply using a low-drop out regulator, comprising: a bandgap circuit (10) providing voltage reference; an operational amplifier (20); a source follower (30) comprises a pass gate for internal power supply; characterized by an overvoltage protection circuit (40) connected to a power detector (50) comprising a logic gate device (41); wherein the logic gate device (41) is configured to determine turning on (141) or turning off (131) the overvoltage protection circuit (40) based on the signal received from the power detector (50) and performing shifting bias mechanism (140) or fix bias mechanism (130) based on the detected voltage levels (120).

In accordance with an embodiment, the low-dropout regulator in the circuity system (200, 200*a*) can be whether in Class A or Class AB. Both Class A and Class AB are types of low-dropout regulator used to provide a stable and consistent voltage to sensitive electronic circuits. The operating principle for Class A is that the pass transistor is always turned on, meaning it conducts current continuously regardless of the load current where for Class AB the pass transistor operates in both linear and saturation regions depending on the load current.

In accordance with an embodiment of the present invention, the pass gate for the source follower (30) is a metal-oxide-semiconductor field-effect transistor. Furthermore, the logic gate device (41) comprises thin gate or thick gate. The logic gate plays a role as power management to the source follower by withstanding the safe predetermined voltage by the medium voltage supply. If the voltage exceeds the safe voltage range, the pass gate unable to handle the excessive voltage before regulation activates. This potential delay in regulation can cause both the pass gate voltage and the internal voltage to momentarily reach high voltage, potentially damaging downstream circuit connected to the regulated rail.

FIG. 1 shows that the low-dropout regulator process (100) leveraging a dual-rail system with separate power-up sequences for high voltage and medium voltage rails. Upon high voltage detection, the low-dropout regulator activates the overvoltage protection circuit (40) to safeguard the thin-gate source following during start-up. The feedback loop utilizes both the actual output voltage and the overvoltage protection circuit (40) signal for regulation with the high voltage rail. Once the medium voltage rail powers up, the low-dropout regulator seamlessly transitions to medium voltage regulation by turning off the overvoltage protection circuit (40) and employing the actual supply voltage for feedback control. This approach ensures Cautious Operation Area protection during startup and enables fast startup functionality for the medium voltage rails, potentially improving overall system efficiency.

Hereinafter, examples of the present invention will be provided for more detailed explanation. The advantages of the present invention may be more readily understood and put into practical effect from these examples. However, it is to be understood that the following examples are not intended to limit the scope of the present invention in any way.

EXAMPLE

Example 1

Monitoring Voltage Levels 110

Referring to the flowchart in FIG. 1, the power supply regulation process involves two distinct voltage levels: high voltage and medium voltage. A power detector (50) or comparator, powered by the high voltage monitors voltage levels (110) and determines voltage level (120). The high voltage powers up first, followed by the medium voltage where the power detector (50) then differentiates between these voltage levels.

Upon determining voltage level (120) readiness, the low-dropout regulator turning on (141) the overvoltage protection circuit (40). The overvoltage protection circuit (40) provides feedback to the low-dropout regulator for regulating the output voltage based on feedback (150). Once the actual supply or medium voltage is available, the low-dropout turning off (131) the overvoltage protection circuit (40) and transitions to a different feedback mechanism. This mechanism utilized the actual passgate, acting as a source follower (30), to regulate the output voltage based on feedback (150) to the custom block.

Example 2

Class A Low-Dropout Regulator

Figure 2:
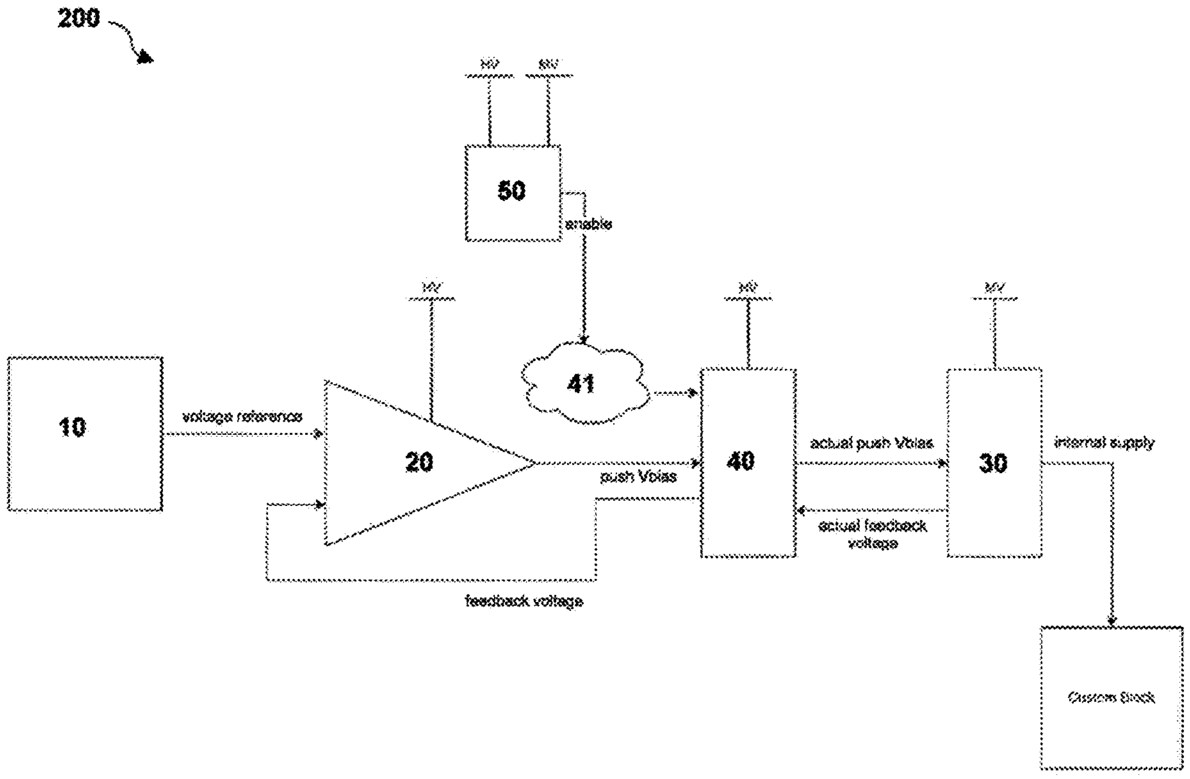
FIG. 2 is circuitry system illustrating a shifting bias mechanism for class A low-dropout regulator in accordance with an embodiment of the present invention.

FIG. 2 illustrates the shifting bias method employed by a Class A low-dropout regulator. For Class A low-dropout regulator, the pass gate at the source follower (30) is always turned on, meaning it conducts current continuously regardless of the load current. This method addresses a specific challenge: lowering the push voltage, Vbias for the logic gate device (41) for a source follower (30) when only the high voltage is available, not the medium voltage. This situation occurs during system startup when the power detector (50) has not yet confirmed the presence of the medium voltage.

This method leverages the threshold voltage of a metal-oxide-semiconductor field-effect transistor (MOSFET) to achieve the safe bias. By adjusting this threshold voltage, the circuit (200) can effectively lower the actual Vbias applied to the source follower (40). This counteracts the higher bias typically required by the feedback system during startup, since the internal supply voltage is not yet available. This dynamically adjusts the Vbias based on the monitoring voltage levels (110) determining voltage level (120) signal from power detector (50). When only the high voltage is present, the MOSFET's threshold voltage is used to reduce Vbias, and the overvoltage protection circuit (40) is turning on (141) ensuring it remains within the Cautious Operation Area limits for the source follower (30). This prevents potential damage or malfunction during startup.

Once the power detector (50) confirms the arrival of the medium voltage, the circuit (200) transitions to a different operating module. The shifting bias method is no longer needed, the overvoltage protection circuit (40) is turning off (131) and the Vbias is regulated based on the feedback (150), ensuring optimal performance and efficiency.

Example 3

Class AB Low-Dropout Regulator

Figure 3:
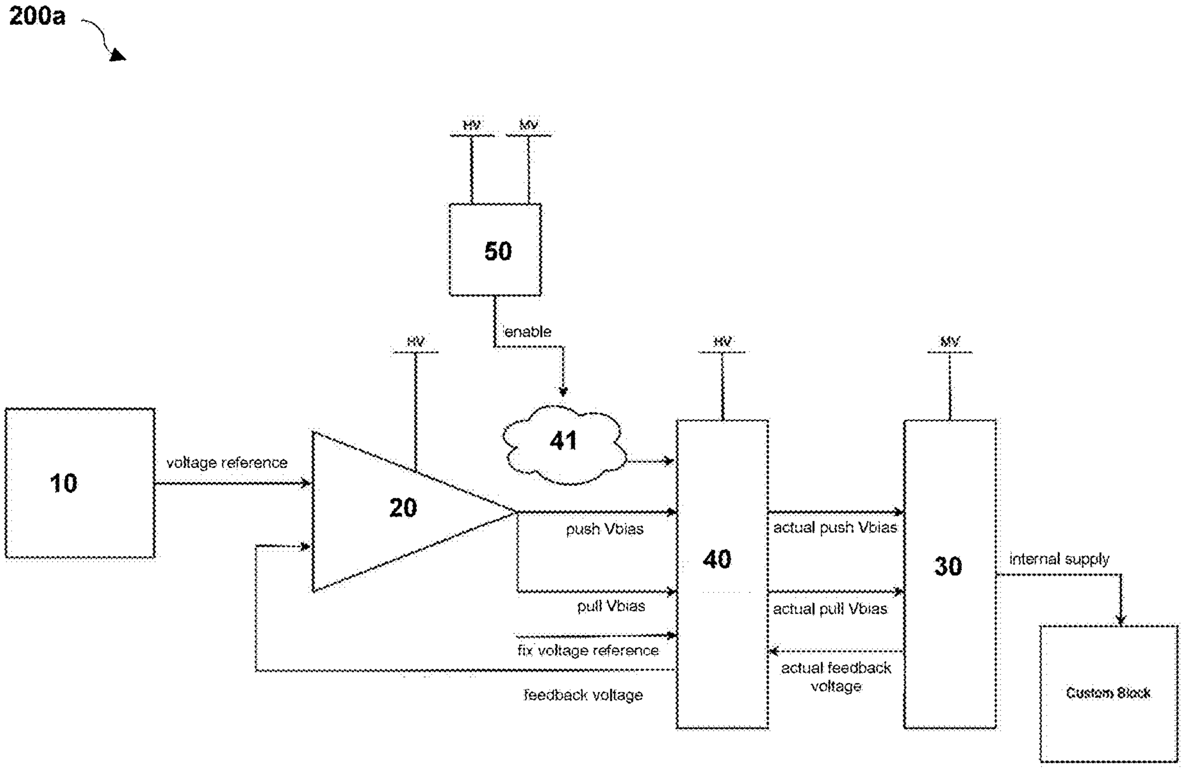
FIG. 3 is circuitry system illustrating a fixed bias mechanism for class AB low-dropout regulator in accordance with an embodiment of the present invention.

Furthermore, FIG. 3 showcases the fixed bias mechanism employed in Class AB low-dropout regulator. For Class AB low-dropout regulator, the pass gate at the source follower (30) operates in both the linear and saturation regions on the load current. At low load currents, the logic gate device (41) operates in the linear region, similar to the Class A. This arises during system startup when only the high voltage is available before the power detector (50) confirms the presence of the medium voltage or actual supply.

To solve this problem, the circuit (200*a*) leverages a thick-gate metal-oxide-semiconductor field-effect transistor (MOSFET), essentially functioning as an overvoltage protection circuit (40). When only the high voltage is present, this MOSFET becomes part of the feedback system. Instead of dynamically adjusting the Vbias like the shifting method, the source follower (40) receives a fixed voltage reference for both push Vbias which turning on (141) the feedback system or pull Vbias which turning off (131) the feedback system, ensuring safe operation within the Cautious Operation Area.

Once the power detector (50) detects the medium voltage, the circuit transitions to its regular operating mode. The overvoltage protection circuit (40) is no longer needed, and the Vbias for the source follower is regulated based on the actual supply voltage or medium voltage. It offers simplicity and potentially lower power consumption.

Example 4

Effectiveness of Overvoltage Protection Circuit (40)

Figure 4:
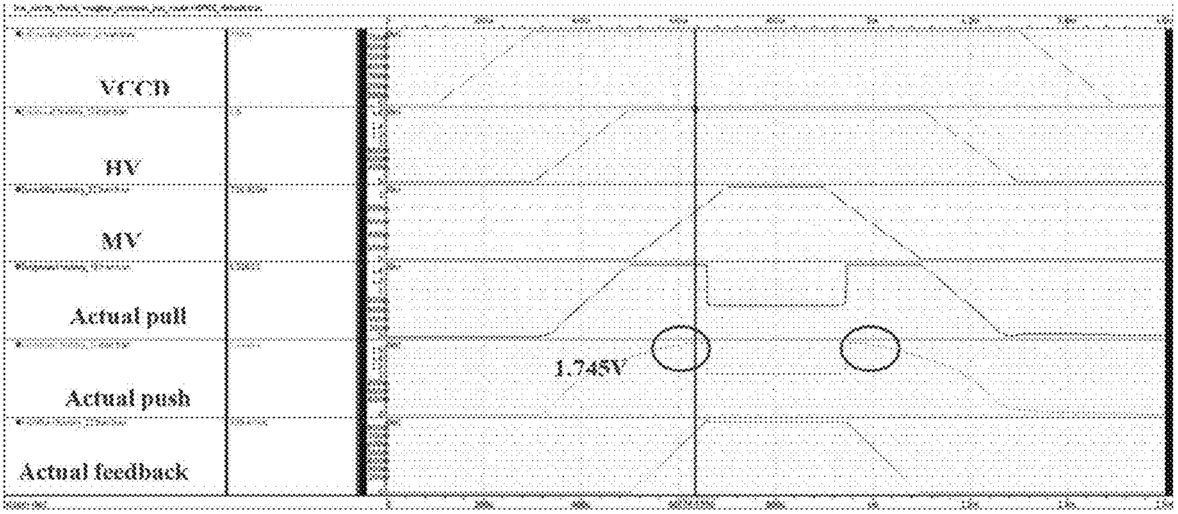
FIG. 4 is a voltage reading illustrating a low-dropout regulator without the overvoltage protection circuit in accordance with an embodiment of the present invention.
Figure 5:
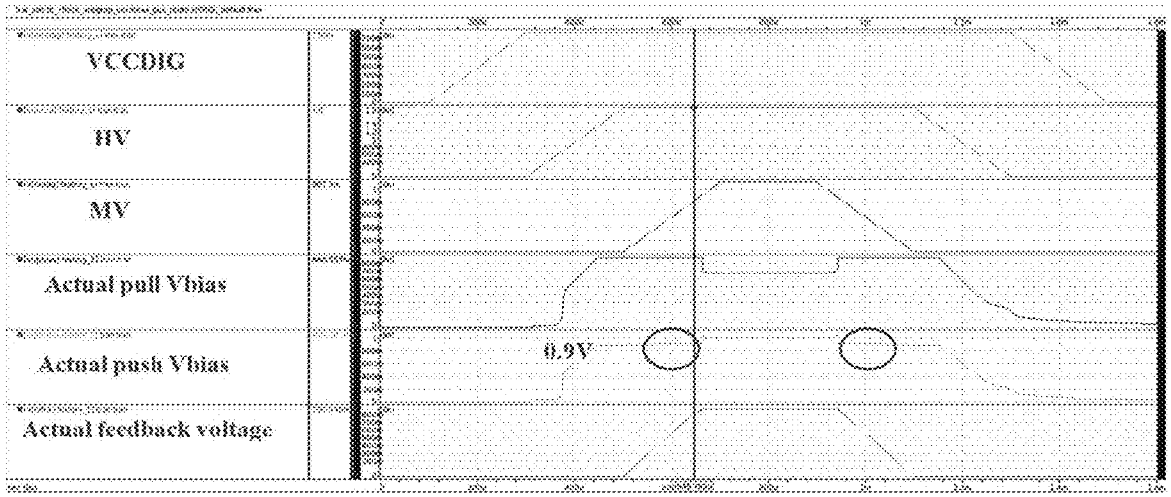
FIG. 5 is a voltage reading illustrating a low-dropout regulator with the overvoltage protection circuit in accordance with an embodiment of the present invention.

FIG. 4 and FIG. 5 highlight the role of the Cautious Operation Area protection system in safeguarding the source follower (30) pass gate within the low-dropout regulator. FIG. 4 shows a scenario without the Cautious Operation Area protection. During power up or down sequences, the "Actual pull Vbias waveform" exhibits a concerning spike exceeding the functional voltage level, highlighted by the circle in the figure. This excessive voltage surges a pose a significant risk of pushing the source follower into the Cautious Operation Area, a region where its operation becomes unreliable and potentially leady to failure.

In contrast, FIG. 5 shows the effectiveness of the Cautious Operation Area protection system in addressing the issue. The circled section in the figure of the same signal "Actual pull Vbias waveform" exhibits a smooth transition, completely eliminating the overvoltage failure witnessed in FIG. 4. This regulates voltage prevents the source follower (30) from entering the Cautious Operation Area, safeguarding its functionality and reliability during power transition.

Crucially, the "Push Vbias" waveform in both figures remain withing its acceptable limits. This highlights that the overvoltage protection circuit (40) does not compromise the regular operation of the source follower (30). Instead, it selectively intervenes to mitigate the harmful voltage spikes that could otherwise trigger Cautious Operation Area failure. The present invention provides an advantage by having a ready bias to the source follower (30) gate, thus allowing for the internal rail to instantly rise up according to the medium voltage rising up. Avoiding this delay can help to elevate any overvoltage risk on the source follower (30) when medium voltage is over the voltage limit of the MOSFET and increase the startup response of the LDO and protection the custom blocks that use receive internal supply from the source follower (30).

Various modifications to these embodiments are apparent to those skilled in the art from the description and the accompanying drawings. The principles associated with the various embodiments described herein may be applied to other embodiments. Therefore, the description is not intended to be limited to the embodiments shown along with the accompanying drawings but is to be providing broadest scope of consistent with the principles and the novel and inventive features disclosed or suggested herein. Accordingly, the invention is anticipated to hold on to all other such alternatives, modifications, and variations that fall within the scope of the present invention and appended claim.

The invention claimed is:

1. A process for regulating power supply using a low-dropout regulator, the process comprising:

monitoring voltage levels by a power detector;

detecting voltage levels based on a predetermined first voltage level as a high voltage and a second voltage level as a medium voltage, wherein the high voltage and the medium voltage power up at different times, with the high voltage powering up followed by the medium voltage;

turning on or turning off an overvoltage protection circuit based on the detected voltage levels;

regulating an output voltage based on a feedback loop utilizing the actual output voltage of a source follower and a predetermined safe voltage as a reference;

performing shifting bias mechanism when the overvoltage protection circuit is turned on; and performing a fix bias mechanism when the overvoltage protection circuit is turned off, wherein turning on the overvoltage protection circuit when high voltage is detected and turning off the overvoltage protection circuit when medium voltage is detected, wherein the shifting bias mechanism comprises lowering an actual bias voltage to counter back the required high bias voltage during the initial power up of the high voltage rail, and applying the actual bias voltage for a feedback system, and wherein the fix bias mechanism comprises applying a fixed voltage reference to an actual pass gate of a source follower for the feedback system, enabling an instant startup together with the medium voltage when it powers up.

2. The process of claim 1, further comprising monitoring voltage levels from a bandgap circuit.

3. The process of claim 1, wherein the first voltage level range is between 1.32V to 1.96V.

4. The process of claim 1, wherein the second voltage level range is between 0.96V to 1.32V.

5. The process of claim 1, further comprising predetermining a safe voltage for supply lower than 1.05V.

6. A circuitry system for regulating power supply using a low-drop out regulator, comprising:

a bandgap circuit providing a voltage reference;

an operational amplifier;

a source follower comprising a pass gate for internal power supply; and an overvoltage protection circuit connected to a power detector comprising a logic gate device, wherein the logic gate device is configured to determine turning on or turning off the overvoltage protection circuit based on a signal received from the power detector and performing a shifting bias mechanism or a fix bias mechanism based on detected voltage levels.

7. The circuitry system of claim 6, wherein the low-dropout regulator includes Class A or Class AB.

8. The circuitry system of claim 6, wherein the logic gate device for the source follower includes a metal-oxide-semiconductor field-effect transistor.

9. The circuitry system of claim 8, wherein the logic gate device comprises at least one of a thin gate a thick gate, or a combination thereof.

* * * * *